Nov. 5, 1963  P. F. FUNDINGER ETAL  3,109,264
ADJUSTABLE AIR GAUGE FOR CONTROLLING THE OPERATIONS OF MACHINES
Filed July 6, 1961
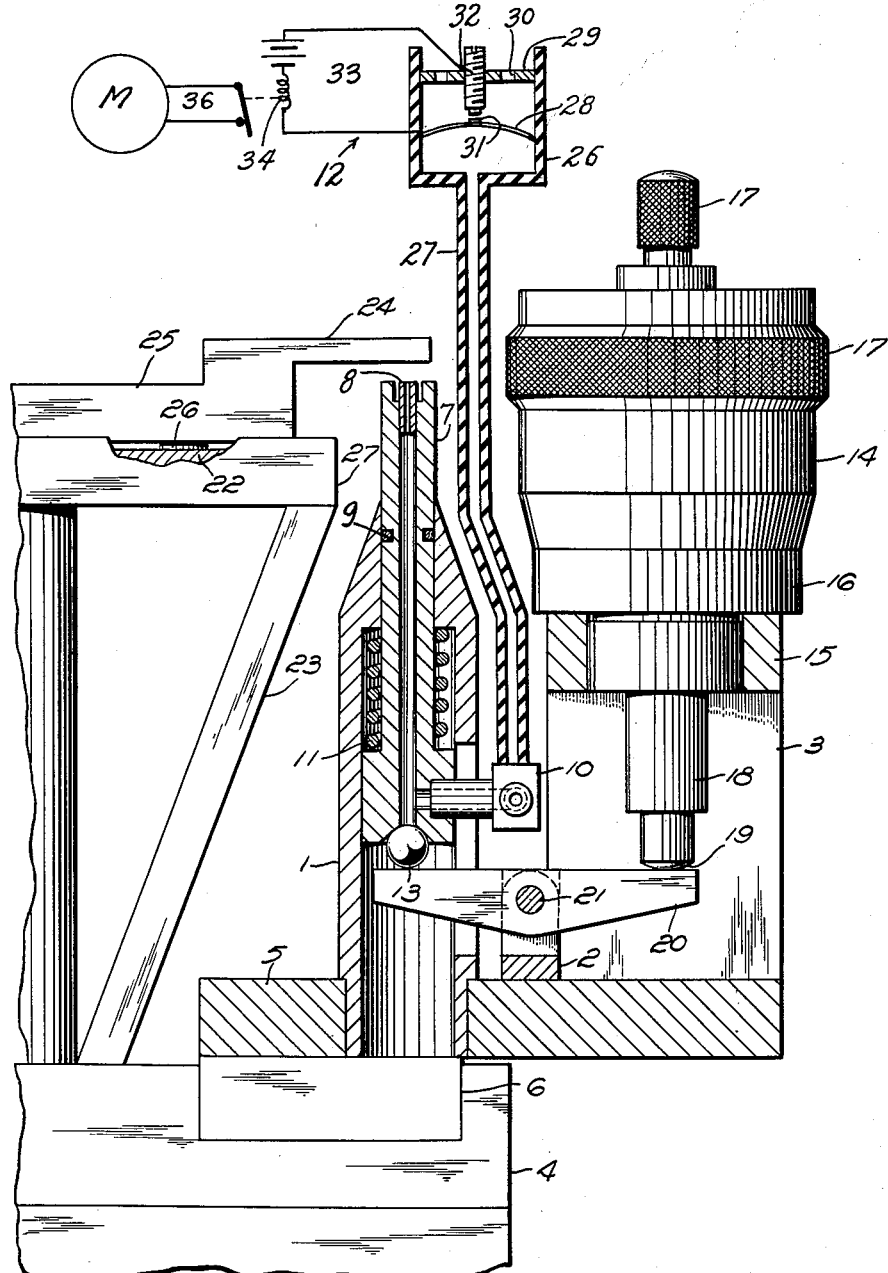
INVENTORS
P. F. FUNDINGER
W. D. HANNIGAN
By A. J. Nugent
ATTORNEY ns patent office
3,109,264
Patented Nov. 5, 1963

3,109,264
ADJUSTABLE AIR GAUGE FOR CONTROLLING
THE OPERATIONS OF MACHINES
Paul F. Fundinger, Philadelphia, and William D Hannigan, Sinking Spring, Pa., assignors to Western Electric Company, Incorporated, New York, N.Y., a corporation of New York
Filed July 6, 1961, Ser. No. 121,540
3 Claims. (Cl. 51—165)

This invention relates to a method and apparatus for automatically detecting predetermined distances between two points and, particularly, to adjustable air operated detection and control means utilized to monitor movement of a first member relative to a second member and discontinue such movement when the distance therebetween has assumed a predetermined value.

In a preferred embodiment, the invention is utilized to automatically control the thickness of semi-conductor slices during the processing thereof by a rotary lapping machine wherein the first member comprises a floating upper lapping plate and the second member the fixed base of the lapping machine.

Prior to this invention, precise measurement and control of the thickness of such slices during the lapping operation has proven difficult and time consuming due to the necessity for frequent manual examinations of the thickness thereof by the machine operator utilizing micrometer or similar manually operated measuring devices. Such examinations are complicated by the interference of small particles of dirt and the frailties of human judgment in correctly estimating the different lapping times necessitated by different slice materials and/or desired slice thicknesses. Relatively slight errors in such measurements and control on the part of the operator have, on the completion of the lapping operation, been found to result in entire batches of semi-conductor slices measuring less than a predetermined minimum thickness and thus proving unsatisfactory for use in transistors or diodes.

It is, accordingly, an object of this invention to provide means for the automatic detection of a predetermined distance between two members moving relative to each other.

Another object of the invention is the provision of means to monitor and discontinue movement of a first member relative to a second member when the distance therebetween has assumed a predetermined value.

A further object of the invention is the provision of adjustable air operated distance detection means, and pressure sensitive means responsive thereto, for automatically controlling the operation of a manufacturing process.

A still further object of the invention is to control the operation of a rotary lapping machine in accordance with the thickness of a batch of semi-conductor slices being lapped thereby, and stop the operation of the machine when the thinnest slice of the batch assumes a predetermined thickness.

In the preferred embodiment herein disclosed, the invention comprises an adjustable air nozzle attached to the fixed base of a rotary lapping machine. The nozzle is directed toward and discharges against a detecting tab mounted on the upper lapping plate of the machine and movable therewith toward the nozzle during the course of the lapping operation. Adjustable, pressure sensitive electrical control means, responsive to nozzle discharge pressure, are connected to the nozzle supply to control the operation of the lapping machine and function to discontinue such operation when the length of the air gap between the nozzle and the tab has assumed a predetermined value to create a predetermined back pressure at the pressure sensitive means indicative of a predetermined thickness of the material being lapped.

The invention and the advantages thereof may be better understood by specific reference to the accompanying drawing wherein the FIGURE is seen to depict an end view, partially in section, of the above-mentioned preferred embodiment.

Referring now to the drawing, nozzle assembly guide tubing 1, lever mounting bracket 2, and micrometer mounting bracket 3 are seen to be mounted atop the fixed base portion 4 of a rotary lapping machine of conventional nature with mounting plate 5 and spacer element 6 positioned therebetween. Orifice stem 7, including orifice insert 8, seal element 9 and air inlet connection 10, is slidably mounted within the said guide tubing and biased therein in a downward direction by balance spring 11 maintained therebetween in the depicted manner.

Adjustable, pressure sensitive electrical control means, indicated generally at 12 are connected to the air inlet connection 10 and responsive to air pressure thereat to control the operation of the lapping machine. One example of such control means, schematically illustrated in the drawings, comprises electrically non-conductive pressure chamber 26 connected as shown by conduit 27 to air inlet connection 10 whereby the back pressure in the latter is accurately communicated to the said chamber. Electrically conductive, metallic diaphragm 28, which includes contact member 31 affixed to the central portion thereof, is mounted across the interior of the chamber as shown to effectively seal off the lower portion thereof. Electrically non-conductive mounting ring 29, including holes 30 formed therein for free passage of atmospheric pressure therethrough, is fixedly positioned in the upper portion of the chamber, and includes adjustable contact member 32 threadedly mounted therein.

Motor control circuit 33, including electromechanical relay 34, is connected across the two contact members 31 and 32 in the depicted manner whereby completion of such circuit by physical contact between the said contact members will result in actuation of the relay to break the motor power supply circuit 36 and discontinue operation of the motor. Accordingly, it may be readily appreciated that as pressure is built up within the lower portion of pressure chamber 26 below diaphragm 28 in the manner set forth in detail hereinbelow, the said diaphragm will be flexed upwardly thereby whereupon physical contact between the contact members and resultant discontinuance of the operation of the lapping machine motor will automatically take place. The exact point at which such physical contact will occur is readily controlled by simple adjustment of adjustable contact member 32. For example, should it prove desirous to reduce the predetermined pressure at which discontinuance of the operation of the lapping machine is to be effected, the said adjustable contact member is simply screwed further into mounting ring 29 to a carefully predetermined extent whereby the distance between the contact members prior to commencement of the lapping operation is decreased and the pressure required below diaphragm 28 to establish contact between the said contact members correspondingly reduced.

A sealing and pivot ball 13 is positioned in sealing engagement with the lower end of slidable orifice stem 7 and thusly maintained in a manner more fully described hereinbelow. Micrometer means, indicated generally at 14, are mounted upon the micrometer mounting bracket 3 with mounting bracket top plate 15 positioned therebetween, and include micrometer head 16, knurled micrometer adjustment portions 17 and stepped, micrometer shaft 18 with rounded end 19.

Ratio lever 20 is pivotally supported on lever mounting bracket 2 by fulcrum pin 21 with opposite ends thereof respectively engaging seal and pivot ball 13 to maintain the ball in engagement with the lower extremity of the orifice stem and the rounded end 19 of micrometer shaft 18.

Rotatable lower lapping plate 22 is positioned adjacent the adjustable nozzle assembly and supported thereat within cover member 27 by support struts 23. During operation of the lapping machine, the material to be lapped—for example, a batch of semi-conductor slices indicated generally at 26—is placed upon the surface of the lower lapping plate, and the vertically movable upper lapping plate placed thereover and supported thereon by surface contact with the material. Accordingly, it may be readily appreciated that the distance, taken along a vertical line, from a plane including the top surface of the upper lapping plate to a parallel plane including the top surface of the orifice insert 8 is directly proportional, at any time during the lapping operation, to the thickness of the material being lapped. Detecting tab 24 is mounted upon the top surface of the movable upper lapping plate 25 and is functionally integral therewith. The tab extends within the path of air discharged from the nozzle assembly orifice insert 8 thereby intercepting same.

Prior to commencement of the lapping operation, the adjustable, pressure sensitive electrical control means is preset to discontinue such operation in response to a predetermined pressure at the nozzle inlet, as for example, 25 p.s.i. The micrometer means are then adjusted to position the nozzle through micrometer shaft 18, ratio lever 20, and pivot ball 13. The nozzle is positioned so that the proximity thereof to the intercepting surface of the detecting tab at the point in time during the lapping operation when the material being lapped has assumed the desired thickness, gives rise to a back pressure at the nozzle inlet and pressure sensitive control means equal to the predetermined pressure thereby effecting the functioning of the control means to deactivate the machine. Activation of the control means to commence operation of the lapping machine follows. Coincidentally therewith, compressed air of predetermined pressure is fed to air inlet connection 10 from any convenient source and discharged from the nozzle through orifice insert 8 against the intercepting surface of detecting tab 24. As the lapping operation progresses, the thickness of the material decreases resulting in gradual downward movement of the upper lapping plate 25 and detecting tab 24 toward the discharge end of orifice insert 8, thus increasing the interference furnished by the tab to the discharge of air from the orifice and creating a substantial back pressure at the air inlet connection and the pressure responsive electrical control means. When the magnitude of such back pressure assumes the predetermined value, and is thus indicative of the material being lapped having assumed the desired thickness, the pressure responsive electric control means function to automatically deactivate the lapping machine thus discontinuing the lapping process and insuring the desired thickness of the material in an accurate, convenient and efficient manner.

In the herein-disclosed embodiment, the invention is specifically designed to detect the thinnest slice in the batch of the material rather than to detect an average thickness. Thus, since the slices are carried around the lower lapping plate during the lapping process with each slice in the batch periodically passing by the detecting region, it is at the time when the thinnest slice in the batch reaches the predetermined thickness, that the control means deactivate the lapping machine. This prevents lapping the slices below the predetermined level thereby minimizing the necessity of having to discard an entire batch of slices.

It is here noted that the disclosed embodiment is intended as indicative of only one of the wide variety of useful purposes to which the instant invention may advantageously be applied without departing from the spirit and scope thereof. It is also noted that various changes may be made in the disclosed embodiment without departing from the spirit and scope of the invention.

What is claimed is:

1. In a device for controlling the operation of a rotary lapping machine which includes a fixed base portion and an upper lapping plate movable theretoward in response to changes in a property of a material being processed thereby, adjustable air nozzle means comprising a guide tubing mounted upon said fixed base portion, an orifice stem including a discharge nozzle and an air inlet connection slidably mounted and spring biased in one direction within the guide tubing, a ratio lever pivotally mounted atop the said base portion adjacent the guide tubing with one end thereof in functional abutment with the end of the orifice stem remote from the discharge nozzle, and micrometer means including a micrometer shaft positioned adjacent the lever mounting with said shaft in abutment with the other end of said lever to thereby bias the orifice stem in the opposite direction therethrough, whereby changes in the position of the micrometer shaft effect pivotal movement of the lever and corresponding changes in the position of the orifice stem within the guide tubing.

2. In a device as in claim 1 further comprising a detecting tab mounted upon the upper lapping plate and located within the path of air discharged from the discharge nozzle and giving rise to a measurable back pressure at the nozzle inlet, the distance between the discharge nozzle and the detecting tab being determinative of the value of the resultant back pressure and indicative of the controlling property and changeable therewith during operation of the machine, and adjustable pressure sensitive control means connected to the nozzle inlet and responsive to a back pressure thereat of predetermined value to discontinue operation of the machine.

3. A lapping machine comprising an upper lapping plate and a lower lapping plate between which material to be lapped is positioned, the upper plate being arranged to move downwardly as the material is lapped and its thickness reduced, a detecting means connected to and extended from the outer portion of the upper plate, an air pressure tube extending in a vertical position below the detecting means, the upper end of the tube having a nozzle positioned adjacent the detecting means, a pivoted lever having one end coupled to the lower end of the tube, pressure sensitive means connected to the tube, and means for adjusting the lever to position the nozzle a predetermined distance from the detecting means at the start of a lapping operation, the pressure sensitive control means being operative to deactivate the machine when the material reaches a predetermined thickness.

References Cited in the file of this patent

UNITED STATES PATENTS

| 2,001,447 | Balsiger | May 14, 1935 |
| 2,083,748 | Steiner | June 15, 1937 |
| 2,647,347 | Blanchette | Aug. 4, 1953 |
| 3,063,206 | Meyerhoff et al. | Nov. 13, 1962 |

FOREIGN PATENTS

| 759,293 | Germany | Sept. 15, 1952 |